United States Patent [19]

Smeltzer et al.

[11] Patent Number: 4,477,062

[45] Date of Patent: Oct. 16, 1984

[54] ADJUSTABLE GAS SPRING SHOCK ABSORBER AND CONTROL DEVICE

[75] Inventors: Paul Smeltzer, Naperville; Mahesh N. Shah, Glendale Heights; Shapoor B. Guzder, Deerfield, all of Ill.

[73] Assignee: Maremont Corporation, Carol Stream, Ill.

[21] Appl. No.: 342,607

[22] Filed: Jan. 25, 1982

[51] Int. Cl.³ .............................................. F16F 9/46
[52] U.S. Cl. ................................. 267/64.28; 422/164
[58] Field of Search .................... 48/61; 188/273, 274, 188/276, 277; 267/64.1, 64.17, 64.28; 422/164

[56] References Cited

U.S. PATENT DOCUMENTS

| | | | |
|---|---|---|---|
| 2,950,785 | 8/1960 | Patriquin | 188/276 X |
| 2,979,326 | 4/1961 | Wilson | 267/64.28 X |
| 3,166,942 | 1/1965 | Huff | 288/276 X |
| 3,506,252 | 4/1970 | Wustenhagen | 267/64.28 |
| 3,666,286 | 5/1970 | Engfer | 267/64.28 X |

Primary Examiner—Duane A. Reger
Attorney, Agent, or Firm—Allegretti, Newitt, Witcoff & McAndrews, Ltd.

[57] ABSTRACT

An adjustable gas spring shock absorber, a control device therefore, and a control device for a fluid mechanism. The control device employs adsorption to regulate the shock absorber or fluid mechanism.

10 Claims, 3 Drawing Figures

ADJUSTABLE GAS SPRING SHOCK ABSORBER AND CONTROL DEVICE

BACKGROUND OF THE INVENTION

This invention relates to an adjustable gas spring shock absorber, a control device for such a shock absorber, and to a control device for a fluid mechanism including a fluid spring.

In the art of shock absorbers, certain adjustable gas spring shock absorbers for automotive use are well known. A representative sample of these shock absorbers includes a pressurizable chamber for air or the like. The position of the upper mount of the shock absorber, and thereby the attached components of the automobile chassis, are determined in part by the pressure of the gas within the chamber. As often preferred, an automotive shock absorber of the type described is adjusted by an automobile owner, through the use of compressed air, to accomodate varying loads in the automobile.

Wholly unrelated to shock absorbers and control devices for fluid mechanisms, but well known to science, is the phenomenon of gas adsorption. Certain gases, called adsorbates, interact to significant extent with certain matter in such a way that a thin layer of molecules of an adsorbate may adhere to the surface of a solid or liquid absorbent with which the adsorbate is in contact. The strength of the adsorbency is determined by the type of adsorbate, the type of adsorbent, pressure of the adsorbate and the temperature of the adsorbent and adsorbate. Adsorbency increases with decreasing temperature and with increasing pressure.

SUMMARY OF THE INVENTION

An object of this invention is to provide an adjustable gas spring shock absorber, a control device therefor, and a control device for a fluid mechanism such as a fluid spring.

Another object of the invention is to improve upon known adjustable gas spring shock absorbers by providing an adjustable gas spring shock absorber which is adapted for automatic or remote manual adjustment.

Another object of the invention is to improve upon known adjustable gas spring shock absorbers by providing an adjustable gas spring shock absorber according to the foregoing objects which is self-contained, i.e., without need of a separate supply of compressed gas such as compressed air.

A further object of the invention is to provide an adjustable gas spring shock absorber according to the foregoing objects which is adapted for vehicular and more specifically automotive applications.

These and other objects and advantages are provided by this invention, which proceeds, in part, from the discovery that the adsorption phenomenon can be adapted with practicality to use in and with adjustable gas spring shock absorbers. Thus, in a principal aspect, the invention is an adjustable gas spring shock absorber including a control device. The shock absorber includes two shock absorber mounts, a fluid chamber, a vessel, gas adsorbent matter, adsorbate, temperature control means and pressure control means. The fluid chamber contains a variably pressurized fluid, and is connected to the mounts. The vessel is pressurizable. The adsorbent is located in the vessel, and has an adsorbency variable with temperature. The adsorbate is of a type readily adsorbed by the adsorbent. The temperature control means constitutes means for providing controlled variation of the temperature of the adsorbent, such that the temperature control means, the adsorbate and the adsorbent constitute means for providing a controlled variation of adsorbency and thereby a controlled variation of pressure within the vessel. The pressure control means operably connects the vessel to the fluid chamber, and constitutes means for providing a controlled variation of the pressure of the fluid in response to the controlled variation of the pressure within the vessel. Therefore, a controlled variation of the fluid pressure within the fluid chamber of the shock absorber is provided by a controlled variation of the temperature of the adsorbent.

BRIEF DESCRIPTION OF THE DRAWING

The preferred embodiment of the invention is described in relation to the accompanying drawing, which includes three figures. These figures are briefly described as follows.

DETAILED DESCRIPTION OF THE PREFERRED EMBODIMENT

Figure 1:
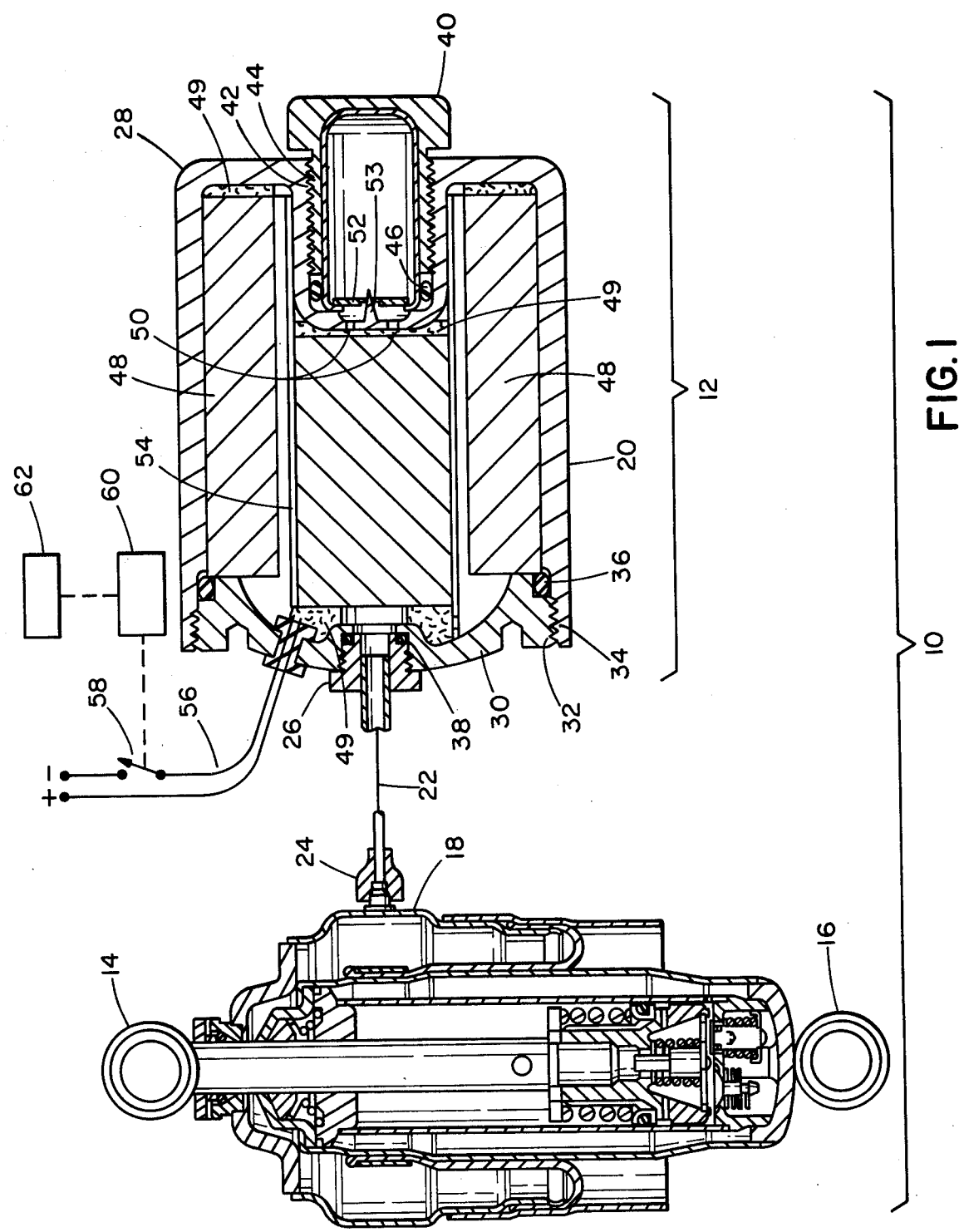
FIG. 1 is a cross-section of a first preferred embodiment, with the control device 12 of the embodiment, shown to the right in the figure, enlarged for clarity, and with certain elements drawn schematically for further clarity.

Referring to FIG. 1 of the accompanying drawing, the first preferred embodiment of this invention is a load adjustable, gas spring shock absorber generally designated 10. Included as an integral part of shock absorber 10 is a control device generally designated 12.

The shock absorber 10 includes an upper mount or more specifically an upper eyering 14, a lower mount or eyering 16 and a gas spring chamber 18. The mounts 14, 16 are linearly movable relative to each other, and the chamber 18 is expandable to increase or decrease the separation of the mounts 14, 16. As conventional, the shock absorber 10 includes a variety of other elements such as a piston assembly, a compression head assembly, inner and intermediate cylinders, an air spring skirt, an elastomeric diaphragm, and rebound and piston bypass valve assemblies. Since these other elements are known to the art, and since a detailed description of these other elements would be confusing of this specification, no such description is provided.

The chamber 18 is operably connected to a canister 20 of the control device 12 through a gas line 22 and appropriate fittings 24, 26. As a result, the interior of the chamber 18 is in open communication with the interior of the canister 20. This is, any gas within either the chamber 18 or canister 20 is free to move between the chamber 18 and canister 20.

A metal canister body 28 defines the interior of the canister 20, and mates with a metal canister end cap 30 to enclose the interior through mating screw threads 32, 34. A seal ring 36 seals the joint between the body 28 and the end cap 30. The fitting 26 is similarly screwed to the end cap 30, and the joint sealed by a seal ring 38.

A metal, pressurized charging cartridge 40 is mounted on the canister body 28, in a recess opposite the fitting 26. The cartridge 40 is screwed into the recess by mating threads 42, 44, and the joint between the cartridge 40 and body 28 is sealed by a ring 46.

The canister 20 is loaded with an adsorbent 48. As most preferred, the adsorbent 48 is composed of carbon granules prepared from an original material such as coconut shells. The adsorbent is maintained in solid rod-shaped and annular-shaped bodies with a binder such as clay or the like. These bodies are cushioned from vibration and pressure due to tolerance mismatching by cushioning elements 49 formed of fiberglass or the like. Granules are preferred for the adsorbent because they provide a greatly expanded surface for adsorption. Materials other than carbon which are suitable include natural and synthetic zeolites such as the materials commonly desigated 5A and 13X.

The canister 20 also contains a charge of adsorbate within its interior. The adsorbate is provided by the cartridge 40. Before mounting of the cartridge 40, the canister 20 is open to its environment through openings 50. Also before mounting, the cartridge 40 contains the adsorbate for the canister 20, sealed inside and behind a pierceable membrane 52. Upon mounting of the cartridge 40, a piercing element such as a needle 53 pierces the membrane 52 and releases the adsorbate to the interior of the canister 20 through the openings 50.

As most preferred, the adsorbate is carbon dioxide gas. Adsorbates other than carbon dioxide which are suitable include other gases composed of polar molecules. With carbon granules as the adsorbent and carbon dioxide as the adsorbate, adsorption of large quantities of adsorbate occurs at moderately low pressures, e.g., 30 to 150 psia, and moderately low temperatures, e.g., 90° F. Once equilibrium conditions occur at a given temperature and pressure in these ranges, further adsorption can be caused by slight decrease of temperature, and desorption can be caused by slight increase of temperature.

In the first preferred shock absorber 10, increase of the temperature of the adsorbent 48 and the adsorbate is caused by an annular heating element 54. As shown, the element 54 extends through the canister 20, and is electrically connected by wiring 56 and a power switch 58, such as a solenoid or switching transistor, to an electrical power supply (not shown) such as a vehicle electrical system. With power supplied, the heating element 54 heats the interior of the canister 20 including the adsorbent and adsorbate, thereby causing desorption.

As should now be understood, the desorption caused by the heating raises the pressure within the canister 20. Since the canister 20 and chamber 18 openly communicate, the pressure within the chamber 18 is also raised. The separation of the mounts 14, 16 is thus increased. Conversely, cooling of the canister 20 caused by heat loss to the environment increases adsorption, reducing the separation of the mounts 14, 16. Automatic control of the power switch 58 is provided by a controller 60, and connected sensing element 62. These components 60, 62 may take a variety of specific forms. For example, the controller 60 may include a microprocessor, and element 62 may include an electrical sensor which senses the separation of the mounts 14, 16 under dynamic conditions. Heating element 54 can thus be controlled in relation to the mean dynamic separation of the mounts 14, 16. As a less sophisticated example, controller 60 may comprise relatively simple electronic circuitry and sensor 62 may include an electrical sensor of separation under static conditions. Heating element 54 can thus be controlled in relation to static separation.

Figure 3:
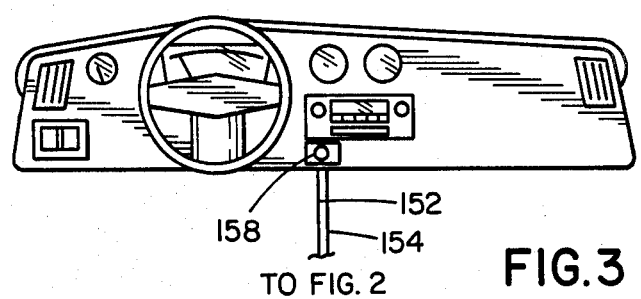
FIG. 3 is a view of an automobile control panel including a manual remote control which is a part of the second preferred embodiment.
Figure 2:
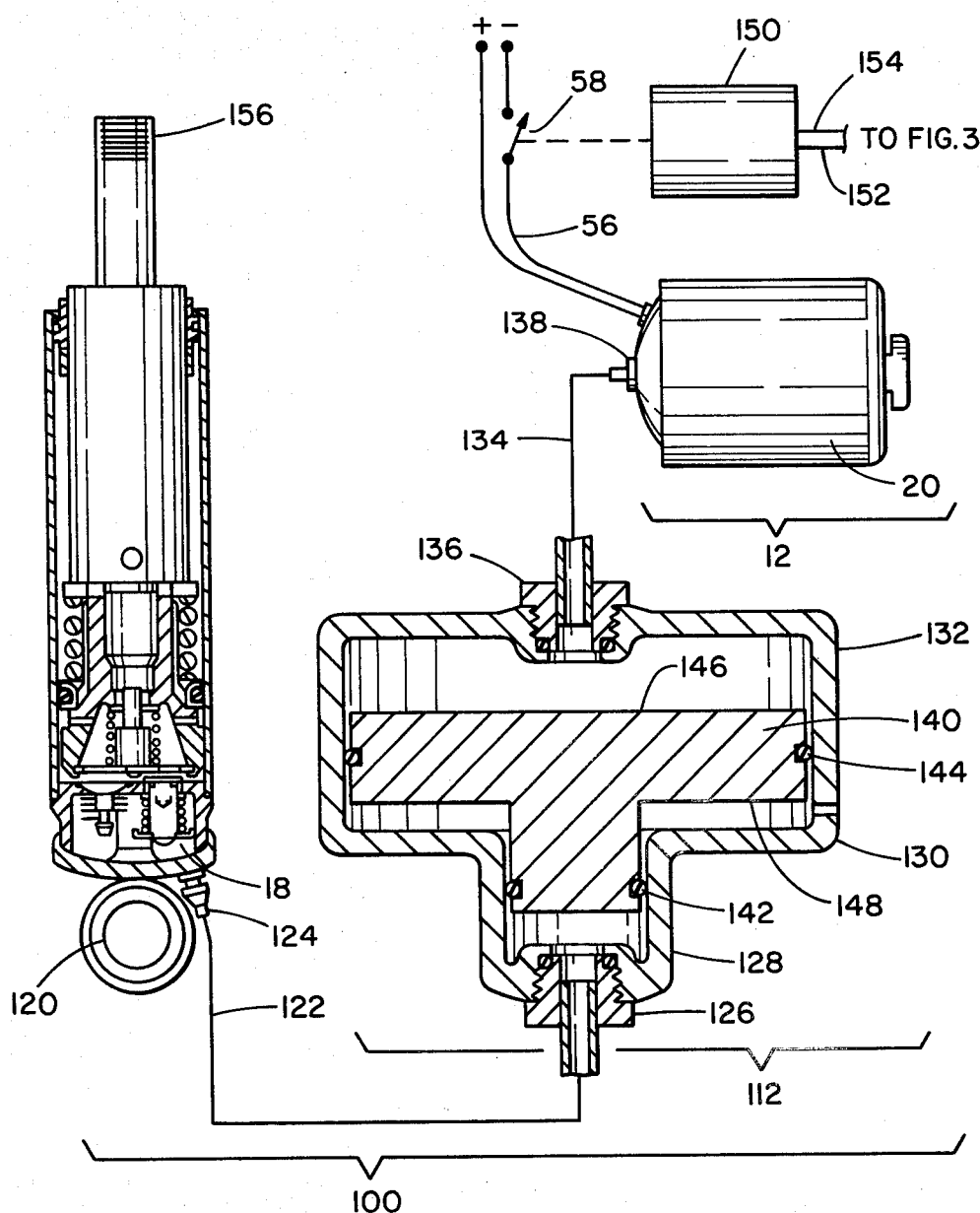
FIG. 2 is a view similar to FIG. 1 of a second preferred embodiment.

The first preferred embodiment of the invention has now been described. Referring to FIGS. 2 and 3, the second preferred embodiment is a load adjustable, gas spring shock absorber 100 of the monotube type. The shock absorber 100 includes the control device 12 as described, and an intensifier generally designated 112. The fluid chamber 18 of the shock absorber 100 is located adjacent the mount 120, and connected by fluid line 122 and fittings 124, 126 to an end 128 of the body 130 of the intensifier 112. The control device 12 is connected to the opposite end 132 of the body 130 by gas line 134 and fittings 136, 138. The chamber 18, line 122 and end 128 are filled with liquid, while line 134 and end 132 are filled with adsorbate. The liquid and adsorbate are separated by an intensifier piston 140 and seals 142, 144. The piston faces 146, 148 are sized in relation to each other such that variation of the adsorbate pressure on the larger face 146 causes increased variation in the liquid pressure.

Control of the heating element 54 in the device 12 of the absorber 100 is manual. The switch 58 is operated by a controller 150 which is connected by wires 152, 154 to a "dashboard" mounted manual control 158. By adjustment of the control 158, a vehicle operator can choose the separation of mounts 120, 156 which suit his needs and desires.

Both preferred embodiments are now described.

For completeness, it should be understood that a variety of equivalents could be substituted for the described components of the shock absorbers 10, 100, and a variety of modifications and embellishments made. As an example, the heating element 54 could be eliminated in favor of other means for controlling temperature such as a controlled supply of vehicular exhaust gases, engine coolant and the like. If desired, protective devices can be incorporated into controllers 60, 150 along with additional sensors to prevent such possible events as overpressurization, underpressurization, overheating, or inadvertent activation. Feedback can be added as desired. Moreover, the chamber 18 and the canister 20 can be separated from open communication and the chamber 18 filled with a fluid other than the adsorbate through the use of means of operably connecting the chamber 18 and canister 20. An example of such means is a diaphragm providing changes of fluid pressure in the chamber 18, which are multiplied over that of the adsorbate in the canister 20. Of course, the specific configurations of the various components can be changed and the canister mounted on, or made an integral, physical part of the shock absorber.

Further, the control device 12 can be utilized for devices other than the load adjustable gas spring shock absorbers which are shown. Such devices could include fluid springs and other fluid mechanisms.

For all these reasons, the preferred embodiments are illustrative and not restrictive of the subject matter regarded as invention. To particularly point out and claim that subject matter, the following claims conclude this specification.

What is claimed is:

1. A control device for a fluid mechanism containing a variably pressurizable fluid comprising:
   a pressurizable vessel;
   adsorbent in the vessel, the adsorbency of the adsorbent being variable with temperature;
   adsorbate in the vessel of a type adsorbed by the adsorbent;

means associated with the vessel for providing controlled variation of the temperature of the adsorbent and adsorbate such that the means, adsorbent and adsorbate constitute means for providing a controlled variation of adsorbency and thereby pressure within the vessel; and means operably connecting the vessel to the fluid mechanism for providing a controlled variation of the pressure of the fluid in response to the controlled variation of the pressure within the vessel;

whereby a controlled variation of fluid pressure is provided.

2. A control device for a spring containing a variably pressurizable fluid comprising:

a pressurizable vessel;

adsorbent in the vessel, the adsorbency of the adsorbent being variable with temperature;

adsorbate in the vessel of a type adsorbed by the adsorbent;

means associated with the vessel for providing controlled variation of the temperature of the adsorbent and adsorbate such that the means, adsorbent and matter adsorbate constitute means for providing a controlled variation of adsorbency and thereby pressure within the vessel; and means operably connecting the vessel to the spring for providing a controlled variation of the pressure of the fluid in response to the controlled variation of the pressure within the vessel;

whereby a controlled variation of fluid pressure is provided.

3. An adjustable fluid spring device including a control device comprising:

at least two spring mounts;

a fluid chamber containing a variably pressurizable fluid and being connected to the spring mounts;

a pressurizable vessel;

adsorbent in the vessel, the adsorbency of the adsorbent being variable with temperature;

adsorbate in the vessel of a type adsorbed by the adsorbent;

means associated with the vessel for providing controlled variation of the temperature of the adsorbent and adsorbate such that the means, adsorbent and adsorbate constitute means for providing a controlled variation of adsorbency and thereby pressure within the vessel; and means operably connecting the vessel to the fluid chamber for providing a controlled variation of the pressure of the fluid in response to the controlled variation of the pressure within the vessel;

whereby a controlled variation of fluid pressure is provided.

4. A device as in claim 1, 2 or 3 in which the fluid is adsorbate.

5. A device as in claim 4 in which the means for providing a controlled variation of the pressure of the fluid provides open communication of the fluid with the adsorbate in the vessel.

6. A device as in claim 1, 2 or 3 in which the adsorbate is carbon dioxide.

7. A device as in claim 1, 2 or 3 in which the adsorbate is composed of polar molecules.

8. A device as in claim 1, 2 or 3 in which the means for providing controlled variation of the temperature comprises means for sensing an external condition, and means for automatically adjusting temperature in relation to the external condition.

9. A device as in claim 3 in which the means for providing controlled variation of the temperature comprises means for sensing the mean dynamic distance between a spring mount and a point of reference, and means for automatically adjusting temperature in relation to the distance.

10. A device as in claim 1, 2 or 3 in which the means for providing controlled variation of the temperature comprises an electrical heating element.

* * * * *